Nov. 22, 1966 L. M. TIPTON 3,286,551
METHOD OF MAKING A CUTTER PLATE
Filed Dec. 11, 1963 2 Sheets-Sheet 1

INVENTOR.
Larry M. Tipton
BY
Lockwood, Woodard, Smith & Weikart
Attorneys

Nov. 22, 1966   L. M. TIPTON   3,286,551
METHOD OF MAKING A CUTTER PLATE
Filed Dec. 11, 1963   2 Sheets-Sheet 2

INVENTOR.
Larry M. Tipton
BY
Lockwood, Woodard, Smith & Weikart
Attorneys

United States Patent Office 3,286,551
Patented Nov. 22, 1966

3,286,551
METHOD OF MAKING A CUTTER PLATE
Larry M. Tipton, 316 Wood Road, Anderson, Ind.
Filed Dec. 11, 1963, Ser. No. 329,669
4 Claims. (Cl. 76—101)

The present invention relates to meat grinding and food chopping.

Presently available meat grinding devices incorporate a cast cutter blade and a one-piece cast plate. It has been found that slight misalignment of the plate and blade of such a device will result in uneven wear of the cutting surfaces. One object of the present invention is to provide a meat grinder incorporating parts which are less expensive and more flexible than previously used cast parts.

Still another object of the invention is to provide an improved device for grinding or chopping food and meat.

A further object of the present invention is to provide an improved cutter plate for use in a meat grinder or food chopper.

Another object of the present invention is to provide an improved method of making a cutter plate for a food chopper or meat grinder.

Still a further object of the invention is to provide an improved apparatus for making cutter plates.

Related objects and advantages will become apparent as the description proceeds.

One embodiment of the meat grinder of the present invention might include a cylindrical housing, three parallel cutter plates having a plurality of aligned openings therethrough, one of said cutter plates having an inneraxially extending flange, two of said cutter plates being received on said flange in stacked engagement with one another and stacked with said one cutter plate, said cutter plates being received in an annular internally threaded cap which is threadedly received on the end of said housing, a worm coaxially received in said cylindrical housing and having a reduced square shaped portion on the end thereof and a further reduced cylindrical portion on the end of said square shaped portion, an annular bearing received within said axially extending flange, said cylindrical portion being received in said bearing, a cutter blade received on said square shaped portion in engagement with said stack of cutter plates and being shaped generally as a four pointed star, said cutter blade being hollowed out at the face engaging said stack of cutter plates to provide the outline of said star in engagement with said stack of cutter plates whereby said cutter blade is self-sharpening by rotation against said stack of plates.

One embodiment of the cutter plate of the present invention might include a plate having a plurality of small cylindrical apertures therethrough, said plate having a plurality of annular recesses on one face thereof each surrounding a respective one of the apertures to define a raised edge at the opening of the aperture. The raised edge is ground off in alignment with the opening to form a sharp edge at the junction of the cylindrical aperture and the ground-off portion.

One embodiment of the method of the present invention might include the step of supporting a flat plate on a support having a circular opening therethrough, said plate having first and second flat surfaces on the opposite sides thereof with the second flat surface engaging the support; the step of punching the plate through with a cylindrical punch of the same diameter as said circular opening to form a circular aperture in the plate, said punch moving through said first flat surface on one side of the plate and then moving through said second flat surface on the other side of the plate into said support; the step of punching the plate around the aperture with an annular punch to form an annular recess in the first surface and surrounding the aperture and to move a portion of the material of the plate against the first punch still within said aperture and to a location outboard of the first surface of the plate, and the step of grinding off said first surface and said portion of material to form a sharp edge at the junction of said aperture and first surface.

The apparatus of the present invention for making cutter plates might include a flat surfaced support for a plate, said support having a cylindrical aperture therethrough, a punch having a cylindrical distal portion of the same diameter as said aperture, said punch cylindrical portion being sharply squared off at its distal end, said punch tapering away from and inwardly from said distal portion in a first frusto-conical surface, said punch including a further portion adjoining said first frusto-conical surface, said further portion including a second frusto-conical surface which diverges at a greater apex angle than said first frusto-conical surface but which extends generally toward said punch distal end, said further portion further including a cylindrical surface having a greater diameter than said cylindrical distal portion and joining and intersecting said second frusto-conical surface to define an annular sharp punching edge coaxial with cylindrical distal portion.

The full nature of the invention will be understood from the accompanying drawings and the following description and claims.

Figure 1:
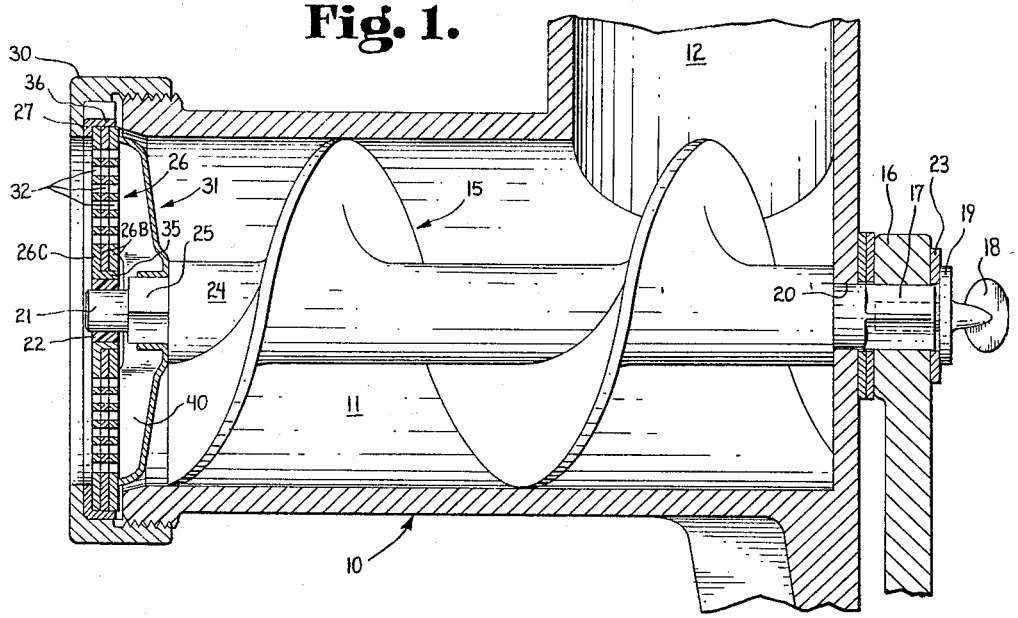
FIG. 1 is a longitudinal section of a grinder embodying the present invention.
Figures 2, 4:
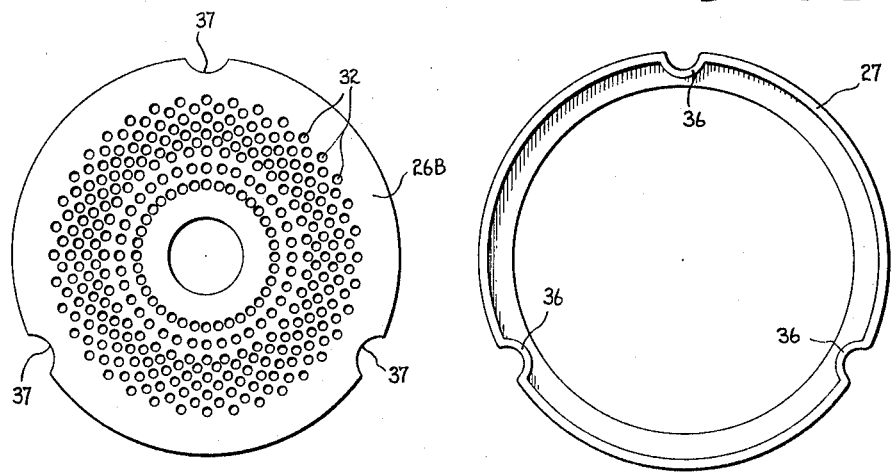
FIG. 2 is a plan view of a cutter plate making up a portion of the structure of FIG. 1.
FIG. 4 is a plan view of an annular retainer making up a further portion of the structure of FIG 1.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to FIG. 1, there is illustrated a meat grinder including a housing 10. The housing 10 has a cylindrical chamber 11 which is fed by a vertical passage 12. Received within the housing 10 and the cylindrical chamber 11 is a worm 15 which can be driven by an arm 16 received upon a square shaped end portion 17 on the worm. The worm 15 is journalled within a cylindrical opening 20 at one end of the housing 10 and has a reduced diameter portion 21 which is journalled within a bearing 22 at the opposite end of the housing 10. The arm 16 is secured to the worm 15 by a screw 18 having a flange 19 retaining washer 23 and the arm 16 on the portion 17.

The worm 15 is rotated in such a direction as to move meat and the like leftwardly as viewed in FIG. 1 along the cylindrical chamber 11 from the passage 12. Worm 15 has a square shaped portion 25 joining its reduced diameter portion 21 and the cylindrical stem 24 of the worm. A plurality of cutter plates 26 are held in position at the end of the chamber 11 by means of an annular retainer 27 and an annular internally threaded cap 30 which is threadedly received on the end of the housing 10. A cutter blade 31 is received upon the square shaped portion 25 and rotates with the worm 15 to cut and mash against material being pressed up against the stack of plates 26 whereby the worm can force the material through the aligned openings 32 in the plates 26.

Figure 3:
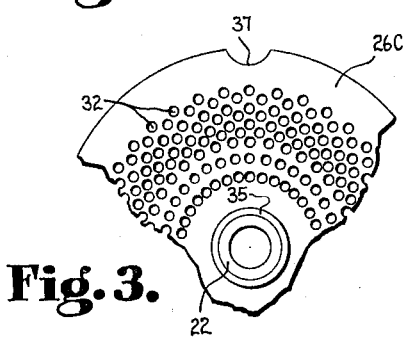
FIG. 3 is a plan view of a further cutter plate making up a further portion of the structure of FIG. 1.

It will be noted that all of the plates 26 are not identical in that the plates 26B do not include the central flange 35 of the plate 26C. The bearing 22 (also shown in FIG. 3) is fixedly mounted within the central flange 35. In other respects, however, the plate 26C is identical to the plates 26B. The various apertures 32 through the plates 26B and 26C are maintained aligned by the retainer 27 which has three inwardly projecting portions 36 extending into three recesses 37 in the outer peripheries of each of the plates 26B and 26C.

Figure 5:
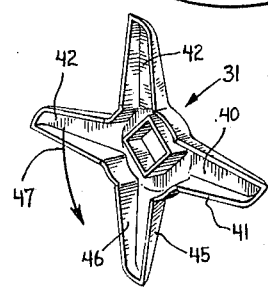
FIG. 5 is a perspective view of a cutter blade making up a still further portion of the structure illustrated in FIG. 1.

Referring to FIGS. 5 and 1, the cutter blade 31 is hollowed out at 40, said hollowed out portion 40 opening on the face of the blade which engages the stack of cutter plates 26. The cutter blade 31, therefore, has a portion 41 which surrounds the hollowed out portion and which engages the first of the two cutter plates 26B. It hs been found that the construction illustrated in FIG. 5 is self-sharpening and because of the two contact portions 45 and 46 of each cutter blade arm 42, the following portion 46 of the cutter blade arm scrapes clean the cutting face of the cutter plate 26B. It has been further found that the two portions 45 and 46 of each contact arm 46 increase the stability of the cutter plates and blade assembly in the meat grinder. It will be noted that the portion 45 of each cutter blade arm is flat while the portion 46 of each cutter blade arm curves around and meets the portion 45. The cutter blade arms are so designed because the cutter blade 31 rotates in the direction of the arrow 47 and, therefore, the material being forced through the openings 32 is pushed ahead of and upon the surface 45 of each arm.

Figure 6:
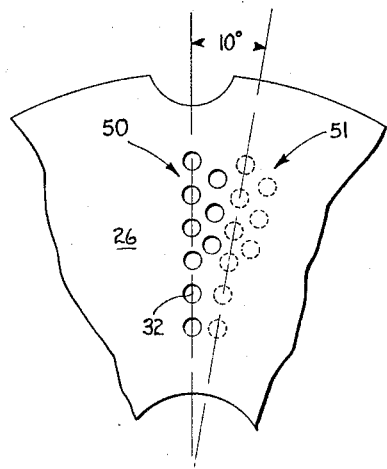
FIG. 6 is a plan view of a cutter plate such as the one illustrated in FIG. 2 showing an intermediate step in the manufacture of the cutter plate.
Figure 7:
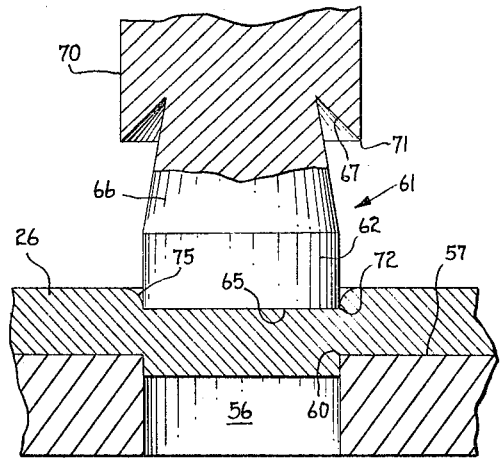
FIG. 7 is a vertical section through a cutter plate and apparatus for operating on the cutter plate and showing a preliminary step in the manufacture of a cutter plate.
Figure 8:
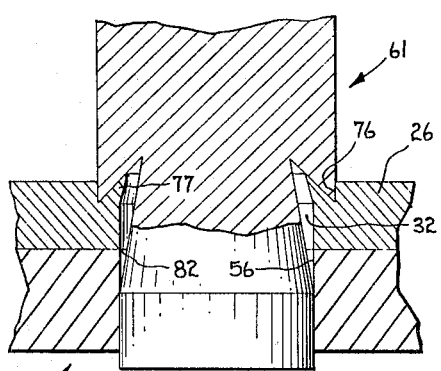
FIG. 8 is a view similar to FIG. 7 showing a further step in the process of manufacture of the cutter plate.
Figure 9:
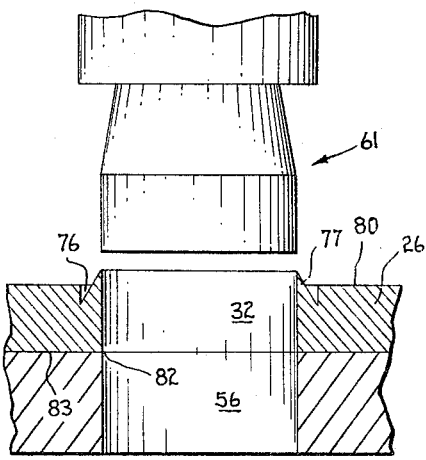
FIG. 9 is a view similar to FIGS. 7 and 8 and showing a still further step in the manufacture of the cutter plate.

Referring now to FIG. 6, the manner in which the cutter plate 26B or 26C is manufactured is illustrated. A stamping device, shown schematically in FIGS. 7–9, is indexed through repeated ten degree angles to repeat the stamping pattern shown at 50, thus the dotted lines at 51 show the location of the next set of apertures to be stamped. Since such indexing and stamping of sheet metal is conventional, the conventional apparatus used is not illustrated.

Applicant's invention does include, however, novel stamping or punching means for forming the apertures 32 in a cutter plate 26. Such stamping means might include the above mentioned indexing apparatus or might be independent thereof. This novel apparatus includes a support 55 having a cylindrical opening 56 therein, said cylindrical opening having its axis perpendicular to the surface 57 of the support and meeting the surface 57 at a relatively sharp edge 60. A cutter plate 26 to be stamped is placed upon the support 55 and is punched by the punch element 61. The punch element 61 includes a distal portion 62 which is cylindrical and which has a sharply squared off distal end 65. Adjoining the cylindrical portion 62, which is of the same diameter as the opening 56, is a frusto-conically shaped surface 66 which converges inwardly away from the distal portion 62 and is coaxial of the cylindrical portion 62.

A further frusto-conical portion 67 has a greater apex angle than the frusto-conical portion 66 and flares outwardly generally toward the distal end of the punching element 61. A cylindrical surface 70 is located proximally of the cylindrical portion 62 and has a greater diameter than said portion 62. The cylindrical portion 70 adjoins and intersects the frusto-conical portion 67 to define a sharp edged punch 71 spaced radially outwardly of the sharp edged punch surface 62 defined by the intersection of the distal end 65 and the cylindrical portion 62.

The steps of the process of the present invention are shown serially in FIGS. 7–9. It can be seen that the punch edge 72 first is used to punch through the plate 26 into the opening 56. This results in a deforming of the plate in such a manner that the surface 75 is rounded off. It is necessary, however, in the final cutter plate 26 to have a sharp edge at the juncture of the cutter plate aperture 32 and the surface of the cutter plate against which the blade 31 rotates. The annular punch portion 71 functions to punch out a recess 76 surrounding the opening 32. The punching of the recess 76 causes the material 77 adjacent the opening to move upwardly and inwardly to the position shown in FIG. 8. The punch element 61 is then withdrawn from the support 55 and the cutter blade 26. The frusto-conical surface 66 of the punch element causes the material 77 to be pushed outwardly and still further upwardly so that the opening 32 is cylindrical throughout its entire length. It will also be noted that the material 77 extends upwardly above the surface 80 of the cutter plate 26.

Figure 10:
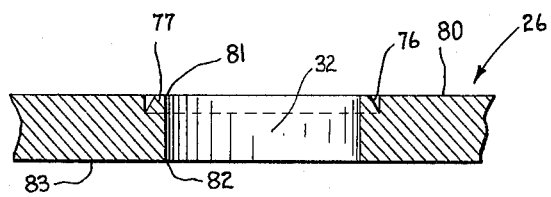
FIG. 10 is a view similar to FIGS. 7–9 showing the final cutter plate after manufacture thereof is complete.

The next step of the process is the grinding off of the surface 80 to remove the portion of the material 77 which projects above the surface 80 and to align the remaining portion of the material 77 with the surface 80 to achieve the result illustrated in FIG. 10. It will be noted in FIG. 10 that a sharp edge is provided at 81 where the surface 80 intersects the surface of the aperture 32. The sharp edge 81 is very useful in the grinding operation since it cooperates with the cutter blade 31 to shear the food or meat.

It will be evident from the above description that the present invention provides a meat grinder including parts which are less expensive and more flexible than previously used cast parts. This is true because of the fact that the two cutter plates 26B can be reversed and/or interchanged to provide additional sharp cutting surfaces against which the blade 31 can operate when the cutting surfaces of a plate are dulled. It can be seen that the edge 82 (FIG. 10) of the cutter plate 26 will be sharp because of the particular punching action by which it is manufactured and that no formation of a recess such as 76 is necessary to provide the proper sharp edge at surface 83.

It will be evident from the above description that the present invention provides an improved cutter plate for use in a meat grinder or food chopper. It can be seen that the present invention provides an improved method of making a cutter plate for a food chopper or meat grinder and that the present invention provides an improved apparatus for making cutter plates, said apparatus comprising the punch element 61 and associated structure.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A method of making a cutter plate for use in a food chopper or the like comprising the step of punching the plate through to form an aperture in said plate; the step of punching the plate around the aperture to form an annular recess in said plate surrounding the aperture to move a portion of the plate material to a location outboard of the first surface of the plate, and the step of grinding off said first surface and said portion of material to form a sharp edge at the junction of said aperture and first surface.

2. A method of making a cutter plate for use in a food chopper or the like comprising the step of punching the plate through to form a circular aperture in said plate, said punch moving through a first flat surface on one side of said plate and then moving through a second flat surface on the other side of said plate; the step of punching the plate around the aperture to form an annular recess in said first surface and surrounding the aperture and to move a portion of the material to a location outboard of the first surface of the plate, and the step of grinding off said first surface and said portion of material to form a sharp edge at the junction of said aperture and first surface.

3. A method of making a cutter plate for use in a food chopper or the like comprising the step of punching the plate through with a first punch to form a circular aperture in said plate, said punch moving through a first flat surface on one side of said plate and then moving through a second flat surface on the other side of said plate; the step of punching the plate around the aperture to form an annular recess in said first surface and surrounding the aperture and to move a portion of the material of the plate against said first punch and to a location outboard of the first surface of the plate; the step of withdrawing the first punch from said plate, and the step of grinding off said first surface and said portion of material to form a sharp edge at the junction of said aperture and first surface.

4. A method of making a cutter plate for use in a food chopper or the like comprising the step of supporting a flat plate on a support with a circular opening therethrough; the step of punching the plate through with a cylindrical punch of the same diameter as said circular opening to form a circular aperture in said plate, said punch moving through a first flat surface on one side of said plate and then moving through a second flat surface on the other side of said plate, said second flat surface engaging said support; the step of punching the plate around the aperture with an annular punch to form an annular recess in said first surface and surrounding the aperture and to move a portion of the material of the plate against said cylindrical punch and to a location outboard of the first surface of the plate; the step of withdrawing the punch from said plate, and the step of grinding off said first surface and said portion of material to form a sharp edge at the junction of said aperture and first surface.

References Cited by the Examiner

UNITED STATES PATENTS

| | | | |
|---|---|---|---|
| 294,738 | 3/1884 | Lane | 76—101 |
| 382,924 | 5/1888 | Wilcox | 72—464 |
| 1,080,875 | 12/1913 | Mayfield et al. | |
| 1,123,710 | 1/1915 | Downs | 146—189 |
| 1,695,898 | 12/1928 | Laemmel | 146—189 |
| 1,979,748 | 11/1934 | Kimmel | 76—104 |
| 2,168,406 | 8/1939 | Harris | 76—104 |
| 2,234,894 | 3/1941 | Bruecker | 76—104 |
| 2,522,440 | 9/1950 | Freter | 72—464 |
| 2,916,069 | 12/1959 | Williams | 146—189 |
| 3,130,609 | 4/1964 | Wahl | 76—101 |

FOREIGN PATENTS 8,937    1904    Great Britain.

ROBERT C. RIORDON, *Primary Examiner.*

W. G. ABERCROMBIE, *Examiner.*